Figure 1:
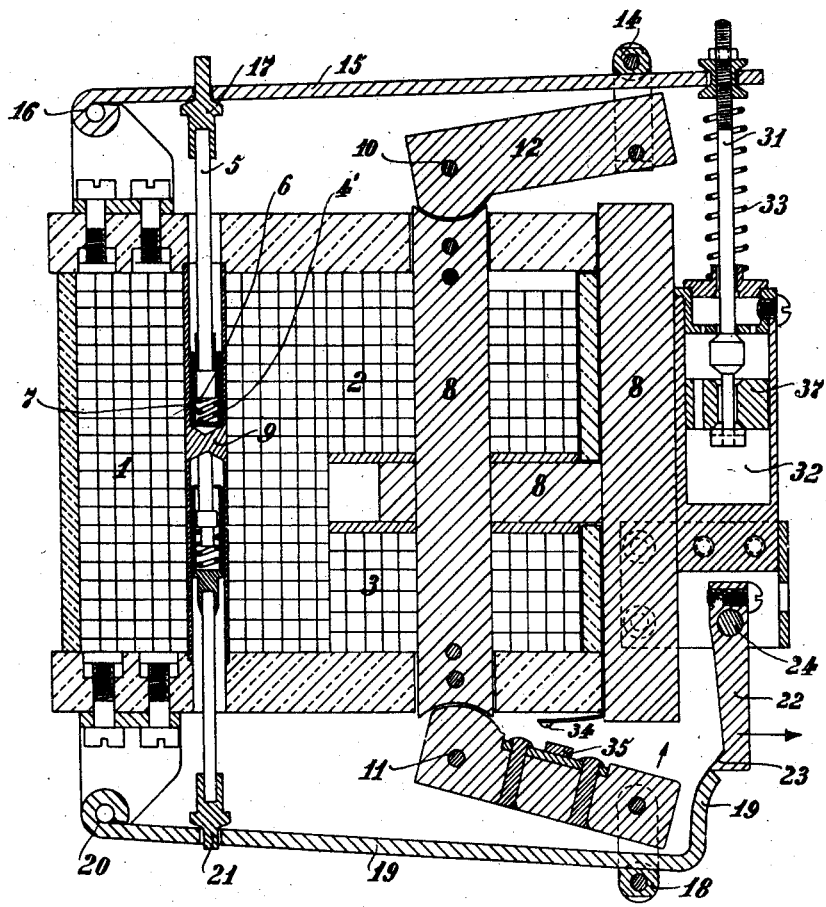

July 26, 1927.

O. DREYER 1,636,953

THERMAL PROTECTIVE DEVICE FOR ELECTRIC CIRCUITS

Filed Oct. 17, 1925

2 Sheets-Sheet 1

Inventor:
Otto Dreyer
by
Attorney

July 26, 1927.

O. DREYER 1,636,953

THERMAL PROTECTIVE DEVICE FOR ELECTRIC CIRCUITS

Filed Oct. 17, 1925    2 Sheets-Sheet 2

Inventor;
Otto Dreyer
by
Attorney

Patented July 26, 1927.

UNITED STATES PATENT OFFICE.

OTTO DREYER, OF ESSEN-ON-THE-RUHR, GERMANY.

THERMAL PROTECTIVE DEVICE FOR ELECTRIC CIRCUITS.

Application filed October 17, 1925, Serial No. 62,979, and in Germany October 20, 1924.

The present invention relates to a thermal protective device for the circuits of electric motors and other electric circuits, in which an electromagnetic switch releasing or actuating device, influenced by the current of the apparatus to be protected, is kept locked from action by means of a soldered joint or similar thermal safety device until a definite temperature is reached or exceeded. The object of the present invention is to so construct the protective device that notwithstanding the melting of the soldered joint at the time the limiting temperature is reached, it is still possible to continue to run the motor with a reduced current which is non-injurious to the motor.

For this purpose the electromagnetic switch releasing or actuating device is so constructed that it remains inactive for a predetermined period in the case of a load which is less than the maximum load current by a certain amount, a time relay governing said releasing or actuating device being provided in order that transient overloads, such as are unavoidable in starting, may exist without the current being switched off.

In order also that the machine may be permitted to operate at reduced current strength after said switch releasing or actuating device has completed its motion, such device is not employed to act directly on the cut-out switch but acts to release the locking device of a second magnet armature, the winding of which is designed for the reduced allowable strength of current and which may be also locked by a second soldered joint having a somewhat higher melting point. The reduction of the permanent current strength at which the second releasing armature is attracted may be such that the quantities of heat generated by repeated starting and other transient overloads are allowed for, which according to the nature of the load might perhaps be about 90% of the normal permanent current.

By means of the above-mentioned construction it is possible to allow the motor to run with safety under certain current overloads and when overheated up to certain degrees, the protective device safe-guarding the motor under such abnormal conditions and acting to absolutely cut off the current supply only in the event of a maximum safe current load or temperature being exceeded. Hence transient overloads such as are unavoidable on starting motors having intermittent loads, may be safely carried to an extent hitherto unattained. The lock solder used for the thermal safety device employed to lock the releasing device preferably has a melting point which lies between 75° and 100° C, that is, it is designed to melt at a temperature which agrees as accurately as possible with the permissible limiting temperature for the winding of electrical machines. In this way the result is obtained that the protective device becomes correspondingly more sensitive as the temperature of the room rises, in contradistinction to such protective devices as work with heat-wires or other materials which do not become effective except at a comparatively high temperature and are consequently less sensitive to room temperatures.

One embodiment of the invention is represented by way of example in the accompanying drawings in which:—

Figure 2:
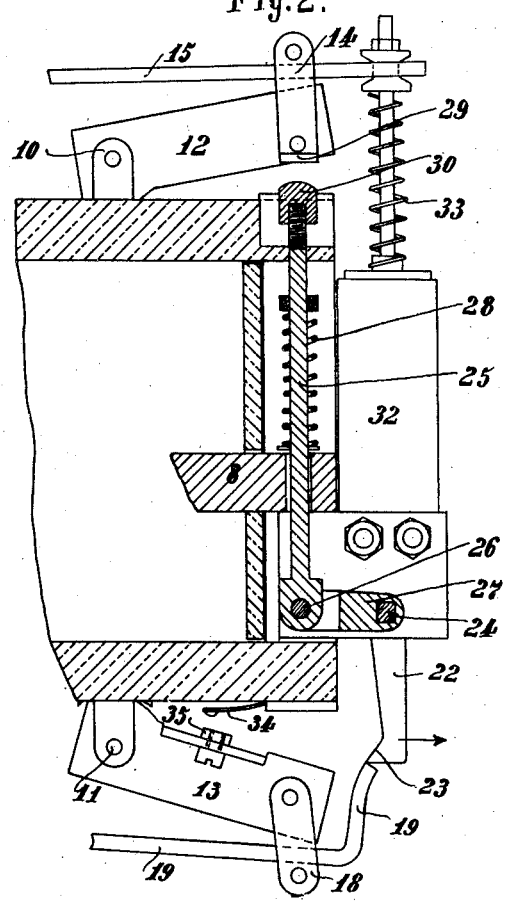

Fig. 1 is a vertical section of a special protective device which is adapted for use for electric railways in which the soldered joint automatically returns to its normal condition;

Fig. 2 a part sectional side elevation of the right half of the same;

In the case of the example shown, 1 is a heating coil and 2 and 3 are magnet coils. All three coils are connected in series and are traversed by the main or load current of the motor to be protected. In the heating coil 1 there are arranged two thermal safety devices which are interchangeably mounted in a casing 4 which is subdivided in the middle by means of a partition 9. The upper thermal safety device consists of a small cylinder 4' in which is firmly soldered by means of an alloy melting at 75° C., for example, the piston 6 fixed on the rod 5, which piston is subjected to the action of a compressed spring 7 which tends to retain the piston 6 with the rod 5 in the raised position illustrated. The lower thermal safety device is similarly constructed, it being so designed that the solder cannot run out downwards. In the case of this second soldered joint it is advisable to employ an alloy having a melting point a few degrees higher, for example, at 80° C.

The electromagnetic switching apparatus consists of an H-shaped iron core 8 with two armatures 12, 13 turning on pins 10, 11, which armatures are respectively influenced by the coils 2 and 3, the latter being somewhat weaker than the former. The upper armature acts, through a shackle 14, upon the lever 15 which turns on the pin 16 and which is held up by the head 17 of the rod 5 which is supported by the soldered joint, said lever being held locked by said rod as long as the soldered joint is not softened. The lower armature 13 acts in a similar manner, by means of the shackle 18, on the lever 19 which turns on the pin 20, and which is held locked by means of the head 21 on the rod held by the lower soldered joint. Lever 19 is additionally locked by means of a prop or detent 22 which is fixed on the shaft 24 and which is provided with a nose 23. On the shaft 24 which carries the prop 22, there is fastened, as can be seen in Fig. 2, a lever 27 with which a rod 25 is connected by means of the pin 26, which rod is held in its raised position by the action of a spring 28. The head 30 of this rod 25 is situated opposite a lateral projection 29 on the shackle 14 which is influenced by the upper releasing device or armature and can consequently be pressed downwards when the releasing armature comes into action so that the nose 23 turns in the direction of the arrow and unlocks the lower releasing armature.

In order to retard the movement of the armature 12 by its magnet coil a brake or retarding device is provided. The latter consists of a cylinder 32 filled with oil or other suitable liquid, the piston 37 of which cylinder is provided in the usual way with a passage for flow of the liquid therethrough and is connected by means of a rod 31 with the lever 15 and is normally held in its raised position by means of the spring 33. The upper armature 12 when it comes into action may if desired act also on signal contacts, while the lower armature 13 brings together the contacts 34, 35 for closing a circuit the release of the main switch, such circuit and switch not being illustrated, and which may be of any well-known type for a maximum, e. g., complete cut-out action.

The mode of operation of the device is as follows:—

Since a complete cut-off action is intended only in the case of direct short-circuits, and under other dangerous conditions the protective device illustrated never comes into play for a complete cut-off action until a definite temperature-limit is reached. Consequently overloads are possible up to a determined maximum and of a duration up to the time required for the unsoldering of the upper soldered joint. At the instant this joint is unsoldered the coil 2 comes into action and attracts the armature 12. This attraction takes place after a determined period, in fact after such a time interval as is determined by the adjustment of the oil pump. When the armature comes to rest, that is, when the retard period ends, a signal in advance can be given as desired by this armature, so that attention may be drawn to the existing state of danger without a switching off action occurring. By the movement of the armature 12 pressure is exerted on the rod 25 so that the lever 22 is so moved in the direction of the arrow that the nose 23 releases the end of the lever 19. The armature 13 is nevertheless still prevented from being drawn upward by magnet coil 3 until the lower soldered joint also softens, which joint possesses a somewhat higher melting point than the upper soldered joint, and not until then is it possible for the armature 13 to be attracted by the coil 3, which can only occur at a definite strength of current, suitably below the determined maximum load current. Current to the motor may, therefore, still flow, notwithstanding the fact that both soldered joints having become sensitive to allow any further permanent load without cut-off as long as this limiting value of the current, for example, 10% below the normal permanent load, determined for the lower armature 13 or the coil 3, is not exceeded. If this value is momentarily exceeded, the armature 13 is drawn upward by magnet 3 and contact is made between 34 and 33 and consequently the maximum cut-out switches off the current. All the coils of the relay thus also become dead and both armatures pass back into their normal positions shown in Fig. 1. The relay remains active as long as the two soldered joints are soft, that is, as long as there is a danger of the temperature of the motor becoming too high. But notwithstanding this condition it is still possible to start under load the motor connected in the circuit, provided that the starting operation does not require more time than is permitted by the delay determined by the oil pump retarder. Thus if in the position represented in Fig. 1 the motor is started again after having been switched in, the current being increased, the armature 13 is first prevented by the nose 23 from closing the cut-out switch until the armature 12 has not yet driven the piston of the oil pump to the limit of its downward movement. This requires a definite time and if the starting operation is completed in this time and the current has returned to about 10% below the normal load, the armature 13 does not switch off the current since the coil 3 acts only at a higher current.

As is evident from the above the mode of operation of the apparatus is completely automatic and by selecting the solder (75° C. to 80° C.) a sensitiveness of action making the device readily responsive to room temperature is obtained. It is also evident that if the solder accidently hardens while the parts are out of normal position, the apparatus cannot fail to work since in this case it does not remain non-sensitive but is rendered more sensitive to controlling conditions.

The above described constructional example of the protective device renders it possible to utilize to an extent hitherto unattained electrical machines, and in particular motors, by providing effective protection against excessive heating while allowing the possibility of overload necessary in practice both on starting and also during running. Of course the invention is not limited to the examples represented since other constructional forms are possible. In particular, the device is not only capable of being used as shown for continuous current but with suitable modifications also for other kinds of current. Further, the amounts given for the regulation of the current, as for example 90% of the normal permanent load current are not to be used for every case but if desired are to be so varied that the additional heatings resulting in practice in consequence of load shocks are balanced by a suitable reduction of the current strength.

I claim:—

1. A thermoelectric controller for electric circuits embodying an electro-magnet, an armature influenced thereby, thermally controlled means for locking and releasing said armature, and a retarder governing the movement of said armature upon the release thereof.

2. A thermoelectric controller for electric circuits embodying an electro-magnet, an armature influenced thereby, thermally controlled means for locking and releasing said armature, and means varying in accordance with lapse of time for controlling the movement of said armature when relased and under the attractive influence of the electro-magnet.

3. A thermoelectric controller for electric circuits comprising a pair of electro-magnetic coils, armatures influenced thereby, thermally controlled means for locking the armature of at least one of said electro-magnetic coils from action and releasing the same so as to be influenced by said coil, and means for holding from action the armature of the other electro-magnetic coil, said means being releasable by the movement of said thermally controlled armature upon the release thereof.

4. A thermoelectric controller for electric circuits embodying an electro-magnet, an armature influenced thereby, thermally controlled means for locking said armature from action and releasing the same for action at a predetermined temperature, and a cushioned brake device for governing the action of the released armature.

5. A thermoelectric controller comprising a pair of comparatively strong and weak electro-magnetic coils, armatures influenced thereby, thermally controlled means for locking said armatures from action and respectively releasing the same so as to be attracted by their coils at relatively different temperatures, and a mechanical locking device for holding the electro-magnet armature governed by the thermally controlled means operative at the lower temperature, said mechanical locking device being releasable by the movement of the other armature upon the release thereof.

6. A thermoelectric controller for electric circuits embodying a pair of electro-magnets operative at relatively different current strengths, armatures influenced thereby, and thermally controlled means for locking said armatures from action and releasing the same for action respectively at predetemined different temperatures.

7. A thermoelectric controller for electric circuits embodying a pair of electro-magnets operative at different current strengths, armatures respectively influenced thereby, thermally controlled means for locking said armatures from movement and for respectively releasing the same for action at predetermined different temperatures, and a retarder governing the movement of the armature released by the thermally controlled means influenced at the lower temperature.

8. A thermoelectric controller for electric circuits comprising a pair of electro-magnets operative at different current strengths, armatures respectively influenced thereby, thermally controlled means for locking said armatures from action and respectively releasing the same for action at predetermined different temperatures, and a locking device for holding from action the armature released at the higher temperature, said locking device being automatically released by the movement of the armature released at the lower temperature.

9. A thermoelectric controller for electric circuits comprising a pair of electro-magnets operative at different current strengths, armatures respectively influenced thereby, thermally controlled means for locking said armatures from action and respectively releasing the same for action at predetermined different temperatures, a retarder governing the movement of the armature released for action at the lower temperature, and a locking device for holding from action the armature released at the higher temperature, said locking device being automatically releasable by the movement of the armature released at the lower temperature upon the release thereof and its attraction by its electro-magnet.

10. A thermoelectric controller for electric circuits comprising a pair of electro-magnets armatures respectively influenced thereby, thermally controlled devices for locking the armatures from action and respectively releasing the same for action at predetermined different temperatures, and re-setting means associated with the thermally controlled locking and releasing devices for retracting the armatures when their electromagnets are demagnetized.

11. A thermoelectric controller for electric circuits comprising a pair of electromagnetic coils, armatures influenced thereby, thermally controlled means for locking the armature of at least one of said electromagnetic coils from action and releasing the same so as to be influenced by said coil, and a mechanical locking device for holding from action the armature of the other electromagnetic coil, said mechanical locking device being releasable by the movement of said thermally controlled armature upon the release thereof.

12. A thermoelectric controller for electric circuits comprising a pair of electromagnetic coils, armatures influenced thereby, thermally controlled means for locking the armature of at least one of said electromagnetic coils from action and releasing the same so as to be influenced by its coil, a mechanical locking device for holding from action the armature of the other electromagnetic coil, said mechanical locking device being releasable by the movement of said thermally controlled armature upon the release thereof, and a retarder governing the action of one of said armatures.

13. A thermoelectric controller for electric circuits comprising a pair of electromagnetic coils, armatures influenced thereby, thermally controlled means for locking the armature of at least one of said electromagnetic coils from action and releasing the same so as to be attracted by its coil, a retarder governing the action of said thermally controlled armature, and a mechanical locking device for holding from action the armature of the other electro-magnetic coil, said mechanical locking device being releasable by the movement of said thermally controlled armature upon the release thereof.

14. A thermoelectric controller for electric circuits comprising a pair of comparatively strong and weak electro-magnetic coils, armatures influenced thereby, thermally controlled means for locking at least the armature of said comparatively strong electro-magnetic coil from action and releasing the same so as to be attracted by its coil, a retarder governing the action of the armature of said comparatively strong coil, and a mechanical locking device for holding from action the armature of said comparatively weak coil, said mechanical locking device being releasable by the movement of the armature of said comparatively strong coil upon the release thereof.

15. A thermoelectric controller for electric circuits comprising a pair of electromagnetic coils, armatures influenced thereby, thermally controlled means for locking said armatures from action and respectively releasing the same for action at predetermined different temperatures, a retarder governing the circuit controlling actions of the armature released for action at the lower temperature, and a locking device for holding from action the armature released at the higher temperature, said locking device being automatically releasable by the armature released at the lower temperature upon the release thereof.

16. A thermoelectric controller for electric circuits comprising a pair of comparatively strong and weak electro-magnetic coils, armatures influenced thereby, thermally controlled means for locking the armatures of said coils from action and respectively releasing the same for action at predetermined different temperatures, viz: the armature of the comparatively strong coil at a predetermined low temperature and the armature of the other coil at a higher temperature, a retarder governing the action of the armature of said comparatively strong coil, and a mechanical locking device for holding from action the armature of said comparatively weak coil, said locking device being automatically releasable by the armature of said comparatively strong coil upon the release thereof.

17. A thermoelectric controller for electric circuits comprising a pair of relatively strong and weak electro-magnetic coils, armatures respectively influenced thereby, and thermally controlled means for locking from action the armature of at least the weaker electro-magnetic coil and releasing the same so as to be influenced by its coil.

18. A thermoelectric controller for electric circuits comprising a pair of relatively strong and weak electro-magnetic coils, armatures respectively influenced thereby, thermally controlled means for locking from action the armature of at least the weaker electro-magnetic coil and releasing the same so as to be influenced by its coil, and locking means for the armature of the stronger coil adapted to be released by the movement of the armature of the weaker coil.

In testimony whereof I affix my signature.

OTTO DREYER.